(12) United States Patent
Vega et al.

(10) Patent No.: US 10,275,138 B2
(45) Date of Patent: Apr. 30, 2019

(54) ZONE RECOGNITION

(71) Applicant: Sonos, Inc., Santa Barbara, CA (US)

(72) Inventors: Luis Vega, Arlington, VA (US); Paul Bates, Santa Barbara, CA (US); Jason Kendall, Pawtucket, RI (US)

(73) Assignee: Sonos, Inc., Santa Barbara, CA (US)

( * ) Notice: Subject to any disclaimer, the term of this patent is extended or adjusted under 35 U.S.C. 154(b) by 184 days.

(21) Appl. No.: 14/475,191

(22) Filed: Sep. 2, 2014

(65) Prior Publication Data

US 2016/0062606 A1 Mar. 3, 2016

(51) Int. Cl.
*G06F 3/0484* (2013.01)
*H04R 3/12* (2006.01)
(Continued)

(52) U.S. Cl.
CPC ......... *G06F 3/04847* (2013.01); *G05B 19/05* (2013.01); *G06F 3/04817* (2013.01); *G06F 3/04842* (2013.01); *G06F 3/165* (2013.01); *G11B 19/025* (2013.01); *G11B 27/34* (2013.01); *H04L 41/0893* (2013.01); *H04N 5/44543* (2013.01); *H04N 21/4325* (2013.01); *H04N 21/43615* (2013.01); *H04N 21/47217* (2013.01); *H04N 21/485* (2013.01); *H04N 21/4825* (2013.01); *H04N 21/8113* (2013.01); *H04R 3/12* (2013.01); *H04W 4/80* (2018.02);
(Continued)

(58) Field of Classification Search
CPC ............. G06F 3/04842; G06F 3/04847; G06F 1/1698; G06F 17/30053
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,438,456 B1 | 8/2002 | Feddema et al. |

(Continued)

FOREIGN PATENT DOCUMENTS

| | | |
|---|---|---|
| EP | 1389853 A1 | 2/2004 |
| WO | 0153994 A2 | 7/2001 |

(Continued)

OTHER PUBLICATIONS

International Searching Authority, International Search Report and Written Opinion dated Jan. 4, 2016, issued in connection with International Application No. PCT/US2015/048171, filed Sep. 2, 2015, 14 pages.

(Continued)

*Primary Examiner* — Daeho D Song
(74) *Attorney, Agent, or Firm* — McDonnell Boehnen Hulbert & Berghoff LLP

(57) ABSTRACT

An example implementation may involve receiving, via a radio interface, a radio transmission indicating a particular playback device of a media playback system. Based on the received radio transmission, the implementation may further involve determining that the device is within a given proximity to a zone of the media playback system that includes the particular playback device. Based on determining that the device is within the given proximity to the zone of the media playback system, the implementation may also involve causing the graphical interface to display an indication of (i) an identifier of the zone and (ii) a characteristic of the zone.

8 Claims, 10 Drawing Sheets

(51) Int. Cl.

| | |
|---|---|
| H04W 4/80 | (2018.01) |
| G11B 27/34 | (2006.01) |
| G11B 19/02 | (2006.01) |
| H04N 5/445 | (2011.01) |
| H04N 21/432 | (2011.01) |
| H04N 21/436 | (2011.01) |
| H04N 21/472 | (2011.01) |
| H04N 21/482 | (2011.01) |
| H04N 21/485 | (2011.01) |
| H04N 21/81 | (2011.01) |
| H04L 12/24 | (2006.01) |
| G05B 19/05 | (2006.01) |
| G06F 3/0481 | (2013.01) |
| G06F 3/16 | (2006.01) |

(52) U.S. Cl.
CPC ............ *G05B 2219/13135* (2013.01); *G05B 2219/13144* (2013.01)

(56) References Cited

U.S. PATENT DOCUMENTS

| | | |
|---|---|---|
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,392,102 B2 | 6/2008 | Sullivan et al. |
| 7,483,538 B2 | 1/2009 | McCarty et al. |
| 7,509,131 B2 | 3/2009 | Krumm et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,290,603 B1* | 10/2012 | Lambourne ............ G11B 27/00 700/94 |
| 8,483,853 B1 | 7/2013 | Lambourne |
| 8,515,413 B1* | 8/2013 | Schilit ................ H04W 4/80 455/419 |
| 8,565,791 B1* | 10/2013 | Schilit ................ H04W 64/00 455/41.1 |
| 9,084,003 B1* | 7/2015 | Sanio ................ H04N 21/6582 |
| 9,277,044 B2* | 3/2016 | Kahn ..................... H04W 4/21 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2003/0228846 A1 | 12/2003 | Berliner et al. |
| 2004/0024478 A1 | 2/2004 | Hans et al. |
| 2005/0246663 A1 | 11/2005 | Yeung et al. |
| 2007/0135087 A1* | 6/2007 | Villevieille ......... H04M 1/6091 455/403 |
| 2007/0142024 A1* | 6/2007 | Clayton ................ H04H 20/08 455/403 |
| 2007/0142944 A1 | 6/2007 | Goldberg et al. |
| 2007/0299737 A1* | 12/2007 | Plastina ............. G06Q 30/0207 705/14.1 |
| 2008/0109852 A1* | 5/2008 | Kretz .................. G11B 27/002 725/62 |
| 2009/0216441 A1* | 8/2009 | Bainbridge ............ G01C 21/20 701/431 |
| 2010/0054275 A1 | 3/2010 | Noonan et al. |
| 2010/0260348 A1* | 10/2010 | Bhow ............... H04N 21/25891 381/81 |
| 2010/0299639 A1* | 11/2010 | Ramsay ................ G06F 3/0486 715/835 |
| 2010/0318911 A1 | 12/2010 | Holladay et al. |
| 2011/0066943 A1* | 3/2011 | Brillon ............... G06Q 30/0603 715/716 |
| 2012/0115503 A1* | 5/2012 | Lynch .................... H04L 67/16 455/456.1 |
| 2012/0117585 A1* | 5/2012 | Curtis .............. G11B 20/10527 725/25 |
| 2013/0076651 A1* | 3/2013 | Reimann ................ G06F 3/0485 345/173 |
| 2013/0080955 A1* | 3/2013 | Reimann ................ G06F 3/0486 715/769 |
| 2013/0094667 A1* | 4/2013 | Millington ............ H04L 12/282 381/104 |
| 2013/0097290 A1 | 4/2013 | Millington |
| 2013/0111347 A1* | 5/2013 | Reilly .................... H04R 27/00 715/716 |
| 2013/0163783 A1* | 6/2013 | Burlingame ........... H03G 5/005 381/103 |
| 2013/0170363 A1* | 7/2013 | Millington ............ H04W 48/18 370/252 |
| 2013/0170647 A1* | 7/2013 | Reilly .................... H04R 27/00 381/17 |
| 2013/0173761 A1* | 7/2013 | Griffiths .............. H04L 12/2809 709/220 |
| 2013/0173794 A1* | 7/2013 | Agerbak ........... H04N 21/43615 709/225 |
| 2013/0174204 A1* | 7/2013 | Coburn, IV ..... H04N 21/43615 725/81 |
| 2013/0317635 A1* | 11/2013 | Bates .................... H04R 27/00 700/94 |
| 2014/0003629 A1 | 1/2014 | Reilly et al. |
| 2014/0087770 A1* | 3/2014 | Cho ........................ H04W 4/02 455/457 |
| 2014/0093085 A1 | 4/2014 | Jarvis et al. |
| 2014/0169569 A1* | 6/2014 | Toivanen ................. H04R 5/04 381/17 |
| 2014/0201635 A1 | 7/2014 | Kumar et al. |
| 2014/0235265 A1* | 8/2014 | Slupik ..................... H04W 4/02 455/456.1 |
| 2014/0269531 A1* | 9/2014 | Luna ..................... H04W 72/00 370/329 |
| 2014/0273859 A1* | 9/2014 | Luna ..................... H04W 4/023 455/41.3 |
| 2014/0274005 A1* | 9/2014 | Luna ..................... H04M 3/56 455/416 |
| 2014/0274185 A1* | 9/2014 | Luna ..................... H04W 24/08 455/517 |
| 2014/0279889 A1* | 9/2014 | Luna .................. G06F 17/30575 707/626 |
| 2014/0354441 A1* | 12/2014 | Luna ..................... H04W 8/005 340/686.6 |
| 2014/0364056 A1 | 12/2014 | Belk et al. |
| 2015/0256954 A1* | 9/2015 | Carlsson ................ H04R 27/00 381/59 |
| 2015/0286360 A1* | 10/2015 | Wachter .................... G06F 3/14 345/173 |
| 2015/0371529 A1 | 12/2015 | Dolecki |
| 2015/0381740 A1* | 12/2015 | Gwin .................... H04L 67/142 709/228 |
| 2016/0005003 A1* | 1/2016 | Norris .................... G06Q 10/10 705/7.19 |

FOREIGN PATENT DOCUMENTS

| | | |
|---|---|---|
| WO | 2003093950 A2 | 11/2003 |
| WO | 2005013047 A2 | 2/2005 |
| WO | 2008042458 A2 | 4/2008 |
| WO | 2011/156783 A2 | 12/2011 |

(56) References Cited

FOREIGN PATENT DOCUMENTS

| WO | 2011156783 A2 | 12/2011 |
|---|---|---|
| WO | 2014074089 A1 | 5/2014 |

OTHER PUBLICATIONS

European Extended Search Report dated Jan. 27, 2016, issued in connection with European Application No. 15002585.6-1905, 9 pages.
iBeacon, [online], 2014 [retrieved Jul. 31, 2014]. Retrieved from the Internet: < URL: http://en.wikipedia.org/wiki/iBeacon >.
WWDC 2014 Session Videos—Apple Developer, 2014.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 A, Jul. 26, 1999, 1068 pages".
"Bluetooth. "Specification of the Bluetooth System: Wireless connections made easy" Core, Version 1.0 B, Dec. 1, 1999, 1076 pages".
"Dell, Inc. "Dell Digital Audio Receiver: Reference Guide" Jun. 2000, 70 pages".
"Dell, Inc. "Start Here" Jun. 2000, 2 pages".
"Jo, J. et al., "Synchronized One-to-many Media Streaming with Adaptive Playout Control," Proceedings of SPIE, 2002, pp. 71-82, vol. 4861".
"Jones, Stephen. "Dell Digital Audio Receiver: Digital upgrade for your analog stereo" Analog Stereo. Jun. 24, 2000 retrieved Jun. 18, 2014, 2 pages".
"Louderback, Jim. "Affordable Audio Receiver Furnishes Homes With MP3" TechTV Vault. Jun. 28, 2000 retrieved Jul. 10, 2014, 2 pages".
"Palm, Inc. "Handbook for the Palm VII Handheld" May 2000, 311 pages".
"Presentations at WinHEC 2000" May 2000, 138 pages.
"UPnP; "Universal Plug and Play Device Architecture"; Jun. 8, 2000; version 1.0; Microsoft Corporation; pp. 1-54".
International Searching Authority, International Search Report and Written Opinion dated Aug. 2, 2016, issued in connection with International Application No. PCT/US2016/026511, filed on Apr. 7, 2016, 14 pages.
Sonos Controller App for iPad Product Guide, Sonos, Inc., Nov. 2014, 47 pages.
"Denon 2003-2004 Product Catalog," Denon, 2003-2004, 44 pages.
European Patent Office, Office Action dated Nov. 25, 2016, issued in connection with European Application No. 15002585.6-1905, 7 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, Office Action dated May 23, 2017, issued in connection with European Application No. 15002585.6, 8 pages.
First Action Interview dated Nov. 1, 2017, issued in connection with U.S. Appl. No. 14/681,735, filed Apr. 8, 2015, 5 pages.
International Searching Authority, International Preliminary Report on Patentability dated Oct. 10 2017, issued in connection with International Application No. PCT/US2016/026511 filed on Apr. 7, 2016, 9 pages.
Preinterview First Office Action dated Aug. 14, 2017, issued in connection with U.S. Appl. No. 14/681,735, filed Apr. 8, 2015, 5 pages.

* cited by examiner

US 10,275,138 B2

ZONE RECOGNITION

FIELD OF THE DISCLOSURE

The disclosure is related to consumer goods and, more particularly, to methods, systems, products, features, services, and other elements directed to media playback or some aspect thereof.

The disclosure incorporates the following non-patent publications by reference in their entirety: the BLUETOOTH® Core Specification 4.1 and Core Specification Supplement (CSS) v4; the IEEE standard 802.11™-2012 Part 11: Wireless LAN Medium Access Control (MAC) and Physical Layer (PHY) Specification; and the GSMA™ TS.26 v6.0 NFC Handset Requirements.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 7A, 7B, and 7C show example graphical interfaces that may be displayed by the device.

Figure 1:
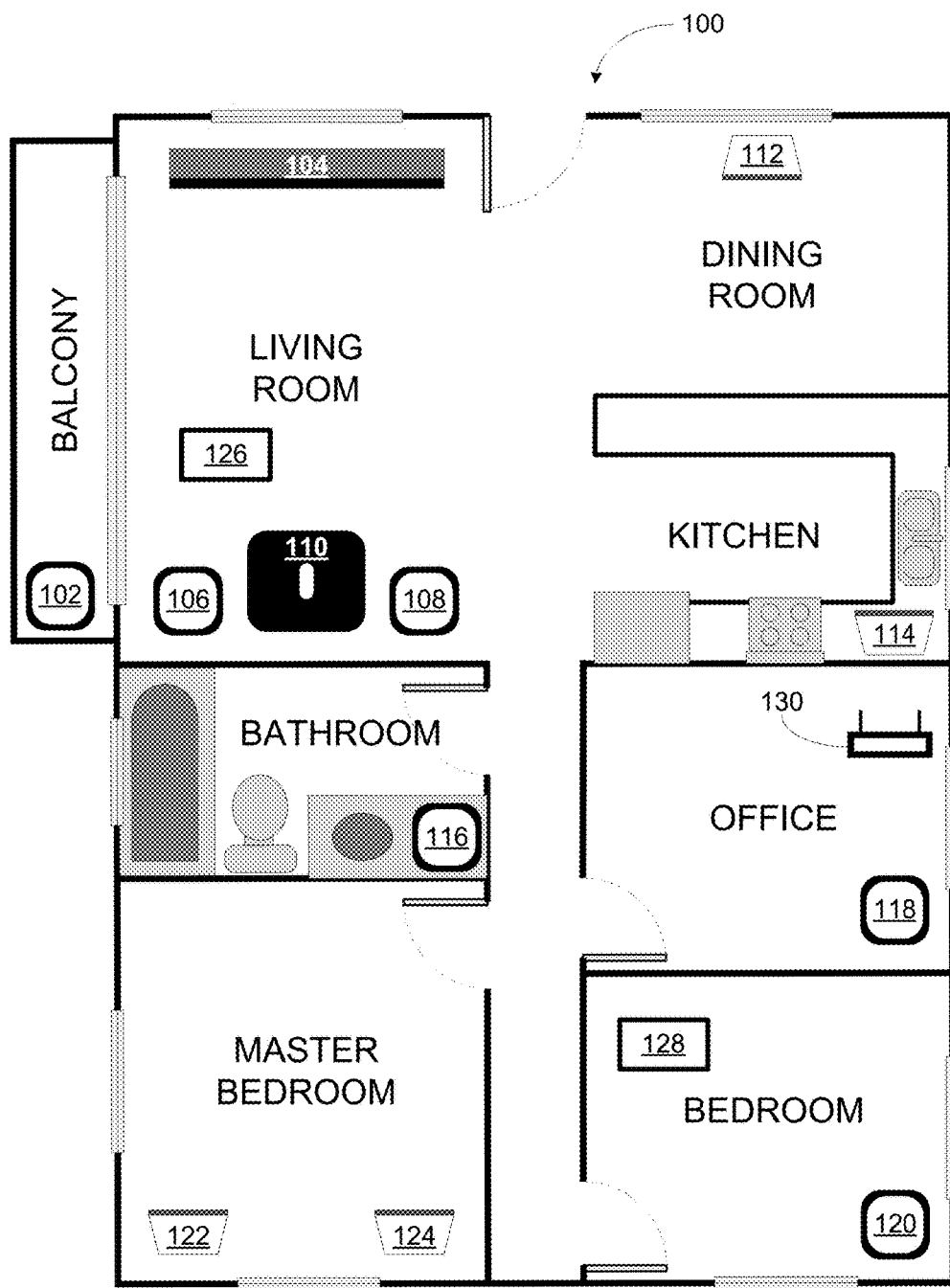
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, determining that a device of a media playback system is within a particular zone of the media playback system and responsively configuring some aspect of the media playback system based on the particular zone that the device is within. An example media playback system may include one or more zones, each zone having one or more playback devices. In some example implementations, playback devices of respective zones may be physically located in respective locations, such as in the different rooms of a house. For example, a media playback system may include a living room zone, a dining room zone, a kitchen zone, an office zone, and/or a bedroom zone, in which playback devices of the different zones are located in the living room, dining room, kitchen, office, and/or bedroom, respectively.

In one arrangement, a device communicatively coupled to the media playback system may have a graphical interface (e.g., a touchscreen display of a tablet, smartphone, or wearable device). Such a graphical interface may display contextual information about a particular zone, such as the name of the zone and/or media content presenting playing on the playback device(s) of the zone. The graphical interface may also display playback controls (e.g., transport controls such as play, pause, or skip track) for controlling media content playback in the zone. The graphical display may display other information as well.

In an example media playback system that includes multiple zones, the graphical interface may transition among the multiple zones, perhaps displaying respective information about each zone at different times. Typically, at any point in time, one of the multiple zones might be more relevant to a user of the media playback system than another zone (i.e., the zone currently in physical proximity to the user). One approach to switching among the multiple zones may involve detecting input that selects a particular one of the multiple zones. For instance, a user may move from a first area in which a first zone is located (e.g., a kitchen zone) into a second area in which a second zone is located (e.g., a living room zone) and then select the second zone on the device. The device may detect such input and responsively display contextual information about the second zone on the graphical interface.

The device and the one or more playback devices of the media playback system may include one or more respective radio interfaces, by which the device may communicate to the playback devices. Such radio interfaces may include one or more of an 802.11 interface (WI-FE)), a BLUETOOTH® interface, or a Near-Field Communications interface, among other examples. The devices may include other types of radio interfaces and protocols as well, including those now known or later developed.

In some implementations, communication between the device and the one or more playback devices of the media playback system may be used to determine that the device is within a given proximity to a particular zone of the media playback system. For instance, some radio interfaces are configured to transmit with relatively low power, and accordingly operate with a relatively short range compared to some other communication interfaces and protocols. Transmitting between the device and a playback device via such a relatively short-range interface may indicate that the device and playback device are within a given proximity. While the transmission range of a given radio interface may vary based on environmental conditions and other factors, successful transmissions may be used to approximate the relative positioning of the device and the playback device, such that the device may be considered to be within a zone that includes the playback device.

Based on a determination that the device is within a given proximity to a particular zone (or perhaps to a playback device of the zone), the device may cause a graphical interface display one or more characteristics of the particular zone. For instance, the graphical interface may display an identifier of the zone (e.g., "Living Room Zone", or perhaps any other identifier assigned to the zone). The graphical interface may display an indication of media content playing in the zone (e.g., one or more of a title, an artist, or an album of a song currently playing on the one or more playback devices of the zone). In some cases, based on the determination that the device is within a given proximity to a particular zone of the media playback system, the graphical interface may transition from displaying characteristics of a first zone to displaying characteristics of the particular zone.

Alternatively, based on the determination that the device is within a given proximity to a particular zone of the media playback system, media playback in the particular zone may be modified. For instance, the device may initiate playback in the particular zone. Alternatively, the device may modify playback in the particular zone (e.g., switch the media playback system to a new playlist, song, or media source). Further, in some implementations, media playback in another zone may be modified. For example, media playback in a zone in which the device was previously within a given proximity of, but is no longer within the given proximity of, may be stopped. Other examples are possible as well.

As indicated above, the present application may involve determining that a device of a media playback system is within a particular zone of the media playback system and responsively configuring the media playback system based on the particular zone that the device is within. In one aspect, a method is provided. The method may involve receiving, via the radio interface, a radio transmission indicating a particular playback device of a media playback system. Based on the received radio transmission, the method may also involve determining that the device is within a given proximity to a zone of the media playback system. Based on determining that the device is within the given proximity to the zone of the media playback system, the method may further involve causing the graphical interface to display an indication of (i) an identifier of the zone and (ii) a characteristic of the zone.

In another aspect, a device is provided. The device may include a graphical interface, a radio interface, at least one processor; a data storage; and a program logic stored in the data storage and executable by the at least one processor to perform operations. The operations may include receiving, via the radio interface, a radio transmission indicating a particular playback device of a media playback system. Based on the received radio transmission, the operations may also include determining that the device is within a given proximity to a zone of the media playback system. Based on determining that the device is within the given proximity to the zone of the media playback system, the operations may further include causing the graphical interface to display an indication of (i) an identifier of the zone and (ii) a characteristic of the zone.

In yet another aspect, a non-transitory computer readable memory is provided. The non-transitory computer readable memory has stored thereon instructions executable by a device to cause the device to perform functions. The function may include receiving, via the radio interface, a radio transmission indicating a particular playback device of a media playback system. Based on the received radio transmission, the functions may also include determining that the device is within a given proximity to a zone of the media playback system. Based on determining that the device is within the given proximity to the zone of the media playback system, the functions may further include causing the graphical interface to display an indication of (i) an identifier of the zone and (ii) a characteristic of the zone.

In another aspect, another method is provided. The method may involve receiving, via the radio interface, a radio transmission indicating a particular playback device of a media playback system. Based on the received radio transmission, the method may also involve determining that the device is within a given proximity to a zone of the media playback system. Based on determining that the device is within the given proximity to the zone of the media playback system, the method may further involve causing the particular playback device to modify media playback.

In a further aspect, another device is provided. The device may include a graphical interface, a radio interface, at least one processor; a data storage; and a program logic stored in the data storage and executable by the at least one processor to perform operations. The operations may include receiving, via the radio interface, a radio transmission indicating a particular playback device of a media playback system. Based on the received radio transmission, the operations may also include determining that the device is within a given proximity to a zone of the media playback system. Based on determining that the device is within the given proximity to the zone of the media playback system, the operations may further include causing the particular playback device to modify media playback.

In yet another aspect, another non-transitory computer readable memory is provided. The non-transitory computer readable memory has stored thereon instructions executable by a device to cause the device to perform functions. The function may include receiving, via the radio interface, a radio transmission indicating a particular playback device of a media playback system. Based on the received radio transmission, the functions may also include determining that the device is within a given proximity to a zone of the media playback system. Based on determining that the device is within the given proximity to the zone of the media playback system, the functions may further include causing particular playback device to modify media playback.

It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
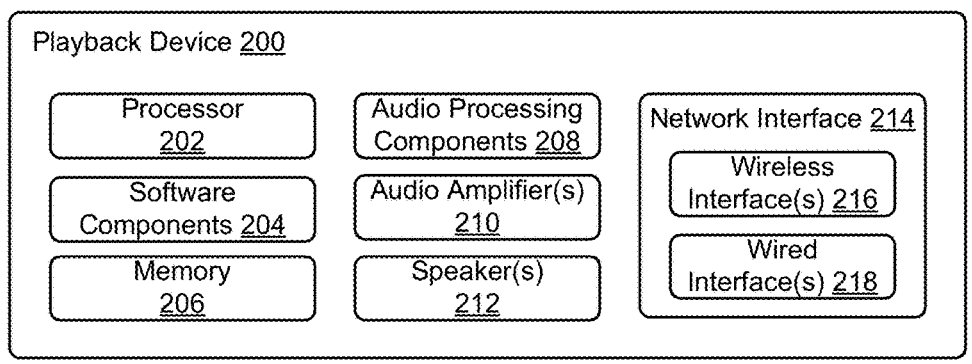
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216. The wireless interface(s) 216 may include one or more radio interfaces which provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.3, wireless standards including IEEE 802.11a, 802.11b, 802.11g, 802.11n, 802.11ac, 802.15, 4G mobile communication standard, BLUETOOTH®, Near-Field Communications (NFC) and so on). In some cases, wireless interface 216 may operate as a wireless access point by allowing wireless devices (e.g., other playback devices) to connect to a network).

Also as shown, the network interface 214 may include wired interface(s) 218. The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
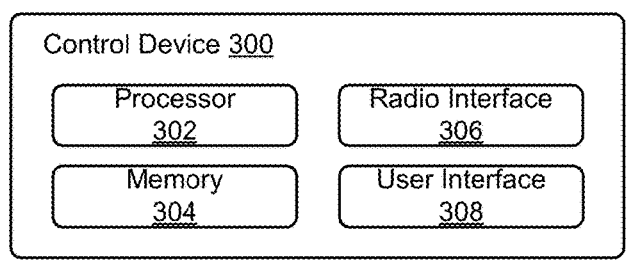
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a radio interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the radio interface 306 may include one or more communications interfaces. The communications interfaces may be based on respective industry standards (e.g., infrared, radio, wired standards including IEEE 802.3, wireless standards including IEEE 802.11a, 802.11b, 802.11g, 802.11n, 802.11ac, 802.15, 4G mobile communication standard, BLUETOOTH®, Near-Field Communications (NFC) and so on). The radio interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
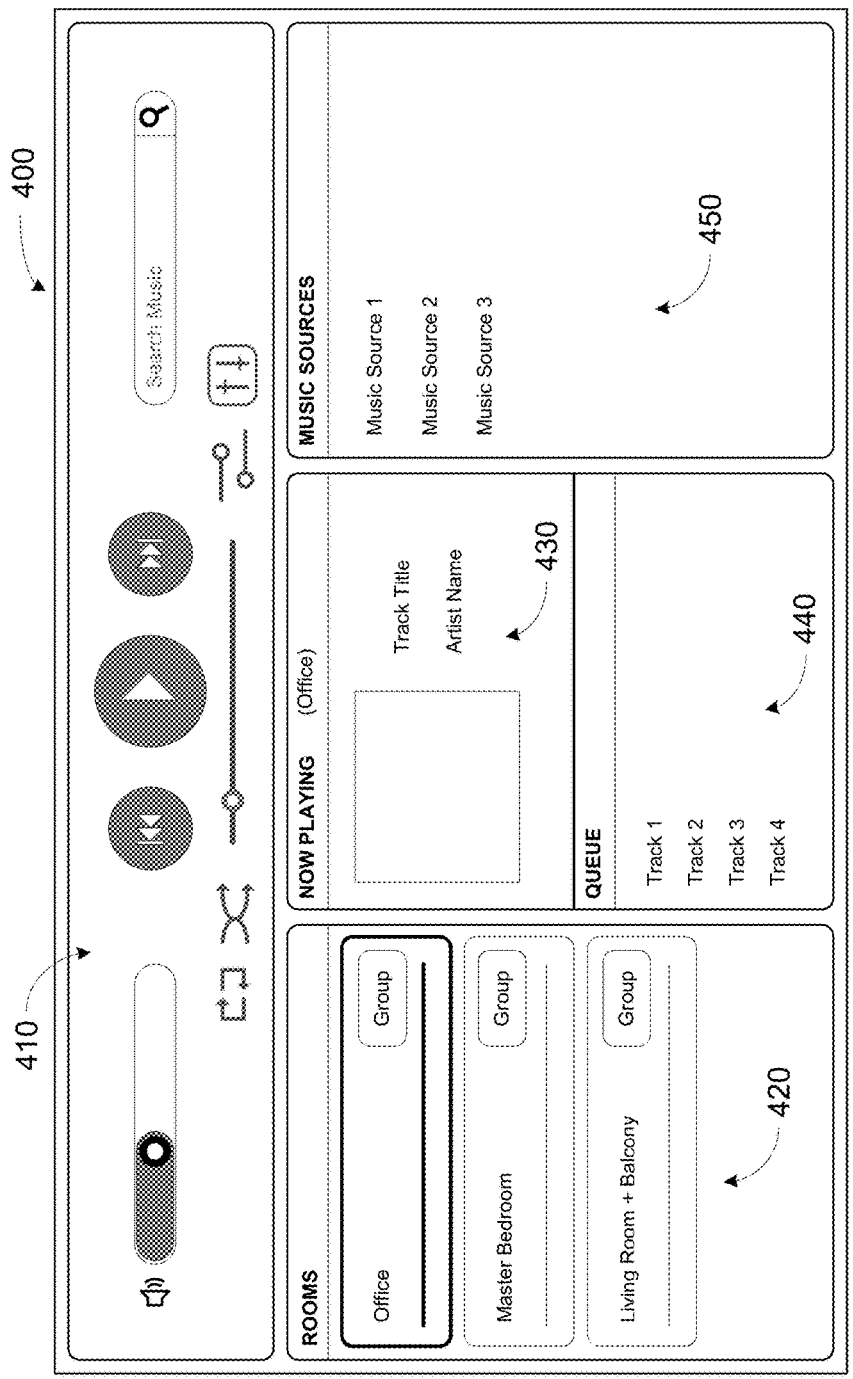
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Cloud Computing Functions

Various references are made herein to "cloud computing" and "cloud" computing system. The term "cloud computing" is used to refer to services delivered using distributed computing over a network, such as the Internet. A non-exhaustive list of services delivered via the cloud include electronic mail (e.g., GMAIL® or HOTMAIL®), social networking (e.g., FACEBOOK®, LINKEDIN®, or TWITTER®), file hosting (e.g., DROPBOX®), and streaming audio (e.g., SPOTIFY®, PANDORA®, or BEATSAUDIO®). Other cloud services are certainly offered as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. In many cases, a user who has access to a given cloud service can access the service from any computing device that is connected to the network, provided that the computing device has a supported interface to the cloud service.

In one instance, accessing a cloud service may involve accessing, with a first computing device (i.e., a client), a "cloud" computing system (i.e., a server). Example client devices may include playback device 200 of FIG. 2, or control device 300 of FIG. 3, among other possible devices. One or more programs or applications (i.e., instructions) may execute on the server to perform computing tasks supported by the cloud service. The client may send various commands to the server to instruct the server to perform the computing tasks supported by the cloud service. The "cloud" computing system may include at least one processor, memory, and a network interface. The memory may contain instructions executable by the processor to perform computing tasks supported by a cloud service.

In aggregate, the provision of a cloud service many involve multiple instances of the "cloud" computing device. Each instance of the "cloud" computing system may provide the cloud service to one or more users. Cloud service providers may scale the number of instances of the "cloud" computing system involved in providing the cloud service based on user demand.

III. Example Methods to Determine Location to within a Zone of a Media Playback System As discussed above, embodiments described herein may involve recognizing that a device of a media playback system is within a particular zone of the media playback system and responsively configuring some aspect of the media playback system based on the particular zone that the device is within.

Figure 5:
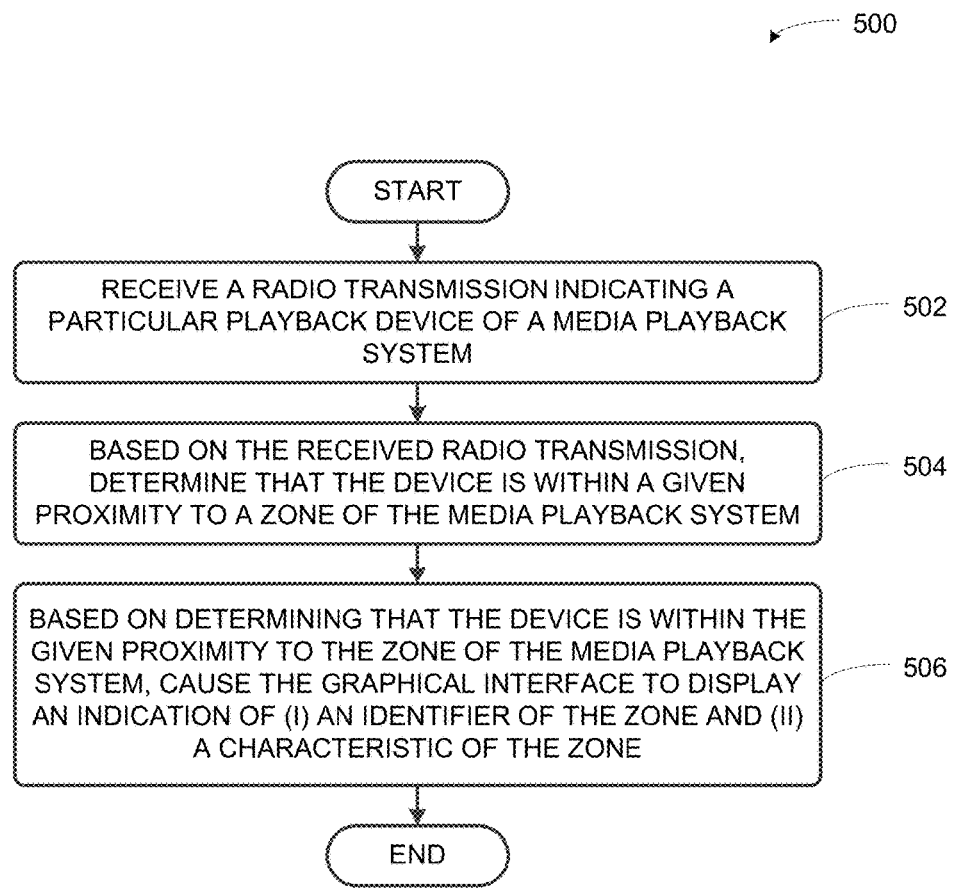
FIG. 5 shows an example flow diagram for responsively configuring a device based on a particular zone of a media playback system that a device is within.
Figure 9:
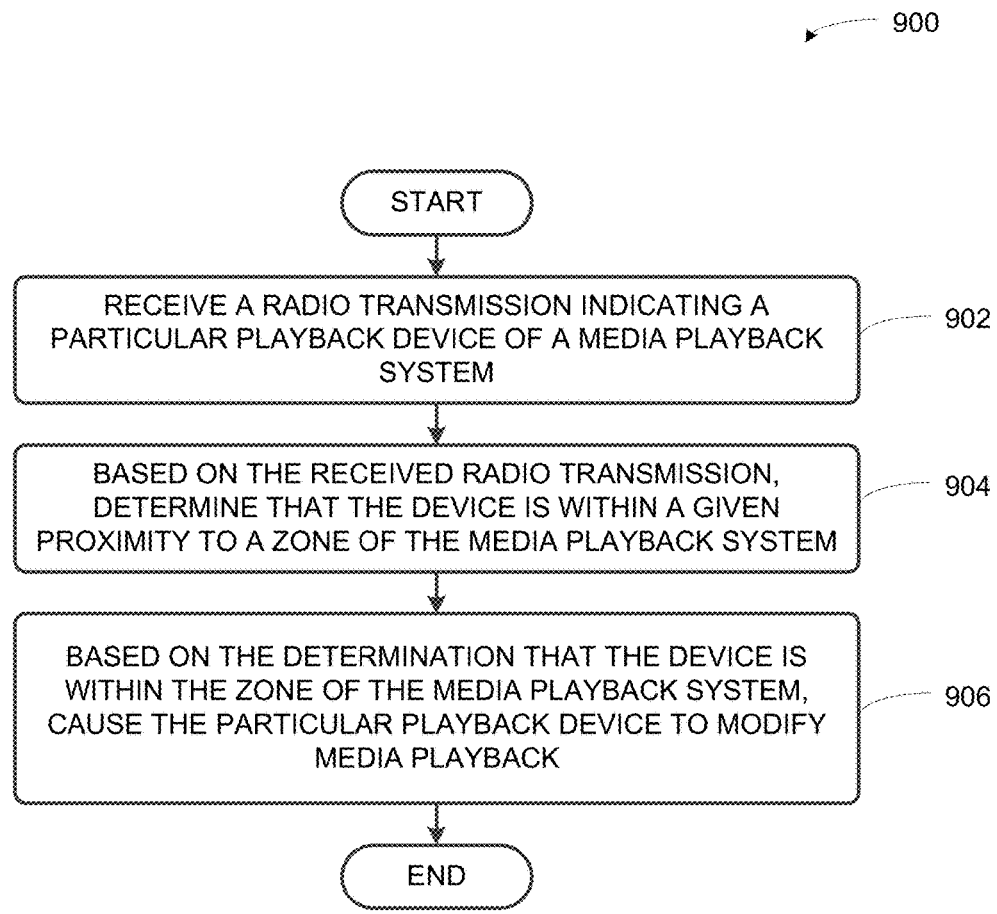
FIG. 9 shows an example flow diagram for responsively configuring a media playback system based on a particular zone of a media playback system that a device is within.

Methods 500 and 900 shown in FIGS. 5 and 9 present embodiments of methods that can be implemented within an operating environment involving, for example, the media playback system 100 of FIG. 1, one or more of the playback device 200 of FIG. 2, and one or more of the control device 300 of FIG. 3. Methods 500 and 900 may include one or more operations, functions, or actions as illustrated by one or more of blocks 502-506 and blocks 902-906. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500, 900, and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500, 900, and other processes and methods disclosed herein, each block in FIGS. 5 and 9 may represent circuitry that is wired to perform the specific logical functions in the process.

a. Example Method to Display an Indication of a Zone in Proximity to a Device.

At block 502, the method may involve receiving a radio transmission indicating a particular playback device of a media playback system. For instance, a device, such as an instance of control device 300 of FIG. 3, may receive a radio transmission via a radio interface, such as radio interface 306, which may operate according to a protocol such as WI-FI®), BLUETOOTH®, or NFC, among other examples. In some cases, a playback device (e.g., the particular playback device) may transmit the radio transmission to the control device. Alternatively, the playback device may send the radio transmission to an intermediate device (e.g., a wearable device such as a smartwatch), which may relay the radio transmission to the control device. In other instances, the transmissions might not be directed to any particular device. For example, the transmissions may be broadcasted, perhaps on a public or known channel.

The radio transmission may indicate the particular playback device of the media playback system in a variety of ways. In some examples, the radio transmission may indicate the particular playback device using an identifier that at least distinguishes the particular playback device from other playback devices of the media playback system. For instance, the identifier may be a media access control (MAC) address assigned to a network interface of the particular playback device. Alternatively, the identifier may be name of the device, perhaps assigned by a control device (e.g., control device 300 of FIG. 3). In other examples, the radio transmission may indicate the particular playback device by reference to a zone that includes the particular playback device (e.g., by reference to a name or other identifier of the zone). Or the identifier may identify a bonded pair that that includes the playback device. Many examples are possible.

In some cases, the device may receive the radio transmission over a radio interface that operates according to a wireless protocol having a known (e.g., rated) transmission strength (power). The transmission range of the wireless protocol may be related to the transmission strength, as the receive strength of the radio transmission may be inversely related to the distance between the transmitting and receiving devices. In some implementations, a protocol operating according to relatively limited transmission strength may be chosen such that the transmission range of the radio interface may be limited to within a given proximity. For instance, certain variants of BLUETOOTH® have a range of less than 10 meters. As another example, some types of NFC interfaces have similar transmission ranges. Further, walls and other obstructions may cause attenuation that may limit the effective indoor range of such protocols to line-of-sight communication within a room.

In some cases, the radio transmission may be part of the protocol by which the radio interface operates. For instance, the BLUETOOTH® protocol includes a pairing procedure that involves using radio transmissions to establish a relationship between two BLUETOOTH®-enabled devices. During pairing, the devices may share information such as the name of the device and/or the address of the device.

Alternatively, the radio transmission may be part of a handshaking operation. For instance, NFC includes various handshaking procedures to exchange information between NFC-enabled devices. As another example, the radio transmission may be part of a "discovery" procedure, in which radio transmissions are broadcasted to "discover" other devices within wireless range of the broadcasting device.

Figure 6:
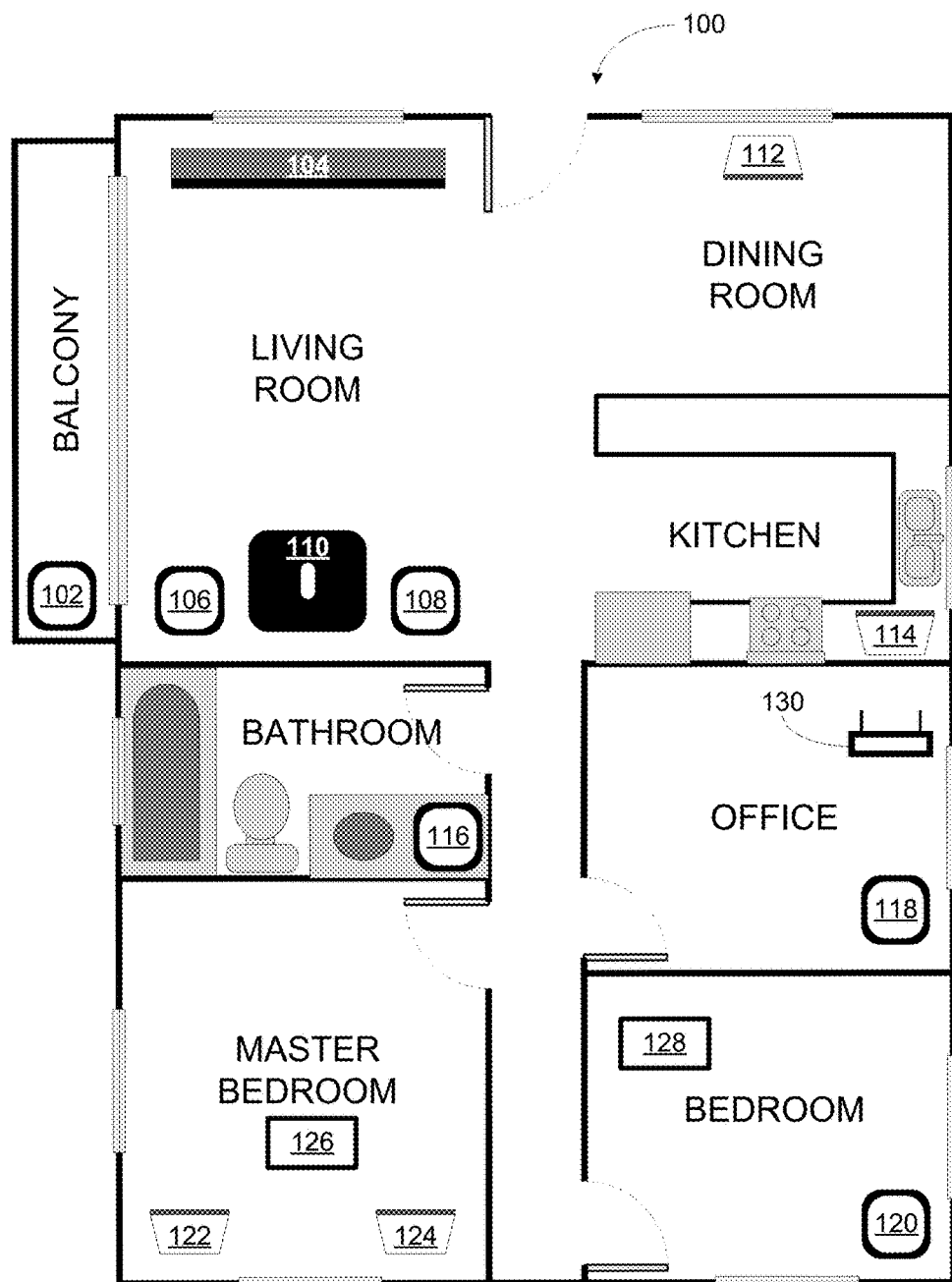
FIG. 6 shows another example media playback system configuration in which certain embodiments may be practiced.

FIG. 6 shows the example media playback system 100 of FIG. 1. In some instances, control devices of media playback system 100 may move throughout the rooms shown in FIG. 1, perhaps carried by a user. For example, FIG. 6 may illustrate example media playback system 100 of FIG. 1 after the control device 126 has moved from the "Living Room" to the "Master Bedroom." As noted above, control device 126 may be, for example, a smartphone, a tablet, a laptop, or a wearable device. Such devices may be carried with users as they move about the household. In the Master Bedroom, control device 126 may receive a radio transmission from playback device 122 (and/or playback device 124) indicating the playback device of media playback system 100, which may ultimately facilitate determining that control device 126 is within the "Master Bedroom" zone that includes playback devices 124 and 126.

As noted above, the physical location of the receiving device may change, perhaps as carried by a user (e.g., from the "Living Room" to the "Master Bedroom"). In some cases, the transmitting device (e.g., the particular playback device) may repeatedly transmit a radio transmission, such that the receiving device may receive one or more instances of the radio transmission after being re-located to within proximity of the transmitting device. The transmitting device may send the radio transmission periodically or perhaps in response to an event (e.g., in response to a prior transmission from the control device), among other alternatives.

At block 504, the method may involve determining that the device is within a given proximity to a zone of the media playback system (that includes the particular playback device). For instance, referring back to FIG. 6, control device 126 may determine that control device 126 is within a given proximity to the "Master Bedroom" zone of media playback system 100 based on a received radio transmission from playback device 122 or playback device 124.

Alternatively, control device 126 may send an indication of the received radio transmission to a second device, such as a playback device or a "cloud" computing system. The second device may determine that the device is within a given proximity to a zone of the media playback system, and send to the device a message indicating that the device is within the given proximity to the zone of the media playback system.

Determining that the device is within a given proximity to a zone of the media playback system may involve determining that the device is within a given proximity to the particular playback device. In some implementations, receiving the radio transmission may in and of itself indicate to the device that the device is within a given proximity to a zone of the media playback system. For instance, the act of receiving a radio transmission over a BLUETOOTH® or NFC protocol (e.g., a message that is part of a pairing or handshaking procedure) may approximate the distance between the particular playback device and the receiving device to within a given proximity.

Alternatively, some implementations may involve detecting the receive strength of the received radio transmission. In such cases, determining that the device is within a given proximity to a zone of the media playback system may involve determining that a receive strength of a received radio transmission is greater than a pre-determined threshold strength. The threshold strength may be configured to a threshold that indicates that the device is within a certain unobstructed distance from the playback device (e.g., 5 meters). Such a pre-determined threshold strength may be a pre-determined percentage of the known transmission strength.

In some cases, the device may receive respective radio transmissions from two or more playback devices. In such a circumstance, the device may be within a given proximity to two or more zones. Alternatively, the two or more devices may belong to the same zone. In some cases, the device may determine which playback device is closer to the device, and then consider itself to be within proximity to the closer playback device. For instance, each received radio transmission may have a respective signal strength. The device may then determine which signal strength is the strongest among the signal strengths of the received radio transmissions (e.g., that the received radio transmission from the particular playback device has the strongest signal strength). Based on such a determination, the device may then determine that the particular playback device is nearest to the device.

Determining that the device is within a given proximity to a zone of the media playback system may involve determining that the particular playback device belongs to a particular zone. As noted above, the received radio transmission may indicate the particular playback device (e.g., by way of an identifier assigned to the particular playback device). The device may look up the zone in which the particular playback device is assigned by reference to the indication.

For example, the received radio transmission may indicate the MAC address of the playback device. The device may maintain or have access to a state table or other data structure that correlates MAC addresses to playback zones. The device may then look-up the zone of the playback device by reference to the MAC address. In some cases, the state table may be maintained by the device itself, perhaps in a memory such as memory 304 of control device 300 in FIG. 3. In other cases, the state table may be maintained by a computing system that is communicatively coupled to the device (e.g., a computing system is networked to the device by way of a local-area or wide-area network, such as the Internet).

Alternatively, the state table may be maintained by one or more of the playback devices of the zone. In some examples, the playback devices may send the state table to one another, such that multiple playback devices have copies of the state table. For instance, a first playback device may update a state table to indicate that a particular device is within a given proximity to the first playback device. The first playback device may send the updated state table to a second playback device, which may notify the second playback device that the particular device is in proximity to the first playback device.

At block 506, the method may involve causing the graphical interface to display an indication of (i) an identifier of the zone and (ii) a characteristic of the zone. Such information may convey the status or context of the zone. For instance, control device 126 of FIG. 6 may cause a graphical display to display an identifier of the "Master Bedroom" zone. The identifier of the zone may be a name that distinguishes the zone from other zones (e.g., "Living Room" zone). The characteristic of the zone may be an indication of a given media item that is being played back by the particular playback device (and perhaps also by one or more other playback devices of the zone in synchrony with the particular playback device). Alternatively, the characteristic of the zone may be an indication of at least one media item queued for playback by the zone (e.g., a song title, an album, an artist, and the like).

FIG. 7A shows an example graphical interface 700A that includes a playback zone region 702A, a playback status region 704A, and a playback control region 706A. Graphical interface 700A may represent an instance of a graphical interface of control device 126 in the configuration of media playback system 100 shown in FIG. 1 in which control device 126 is in the Living Room. The playback zone region 702A includes an indication of the "Living Room" zone, as shown, as well as an indication of the manufacturer of the media playback system ("SONOS®"). The playback status region 704A includes multiple characteristics of the "Living Room" zone, including characteristics of media currently playing or queued in the zone. The characteristics include Album Art A, Song Name A, Artist Name A, and Media Source A, which may represent a first instance of the example audio content noted above. The playback control region 706A includes transport controls for the "Living Room" zone. Such controls may initiate, stop, or modify media playback by playback devices 106, 108, and 108 (i.e., the playback devices in the "Living Room" zone).

In some cases, some operations related to control of the media playback system may be performed by a controller application that is executing on a device. Such operations may include display of a graphical interface having controls (e.g., example graphical interface 700A), detection of input (e.g., detection of input in playback control region 706A), and translation of the detected input into commands to the media playback system. Based on launch (i.e., execution) of such an application, the device may determine whether it is near a playback device. For instance, the device may detect and receive a radio transmission from a playback device (e.g., playback device 106 of FIG. 1), determine that it is within a given proximity to the zone of the playback device (i.e., the "Living Room" zone), and then, based on the determination, cause a graphical interface to display an indication of (i) an identifier of the zone and (ii) a characteristic of the zone, as illustrated by graphical interface 700A of FIG. 7A. Alternatively, a playback device may detect and receive a radio transmission from a control device, determine that the control device is within a given proximity to the zone of the playback device, and then, based on the determination, cause a graphical interface to display an indications. Further, as noted above, in some implementations, another device, such as a wearable device, may be an intermediary between the device executing the controller application and the playback device.

In some cases, the device may cause the graphical interface to display an indication of (i) an identifier of the zone group, and (ii) a characteristic of the zone group in response to a condition or state of the controller application. For instance, the device may detect input to a user interface that causes the graphical interface to update or refresh, and based on such detect input, cause the graphical interface to display the indications. Alternatively, the device may detect launch (i.e., execution) of such an application, based on that operation(s), cause the graphical interface to display the indications.

FIG. 7B shows an example graphical interface 700B that includes a playback zone region 702B, a playback status region 704B, and a playback control region 706B. Graphical interface 700B may represent an instance of a graphical interface of control device 126 in the configuration of media playback system 100 shown in FIG. 6 in which control device 126 is in the Master Bedroom. The device may cause display of such an interface based on determining that the device is in a given proximity to the "Master Bedroom" zone. In some cases, the device may update graphical interface 700A to graphical interface 700B. The playback zone region 702B includes an indication of the "Master Bedroom" zone, as shown. The playback status region 704B includes multiple characteristics of the "Master Bedroom" zone, including characteristics of media currently playing or queued in the zone. The characteristics include Album Art B, Song Name B, Artist Name B, and Media Source B, which may represent a second instance of the example audio content noted above. The playback control region 706B includes transport controls for the "Living Room" zone. Such controls may initiate, stop, or modify media playback by playback devices 122 and 124 (i.e., the playback devices in the "Master Bedroom" zone).

Figure 8:
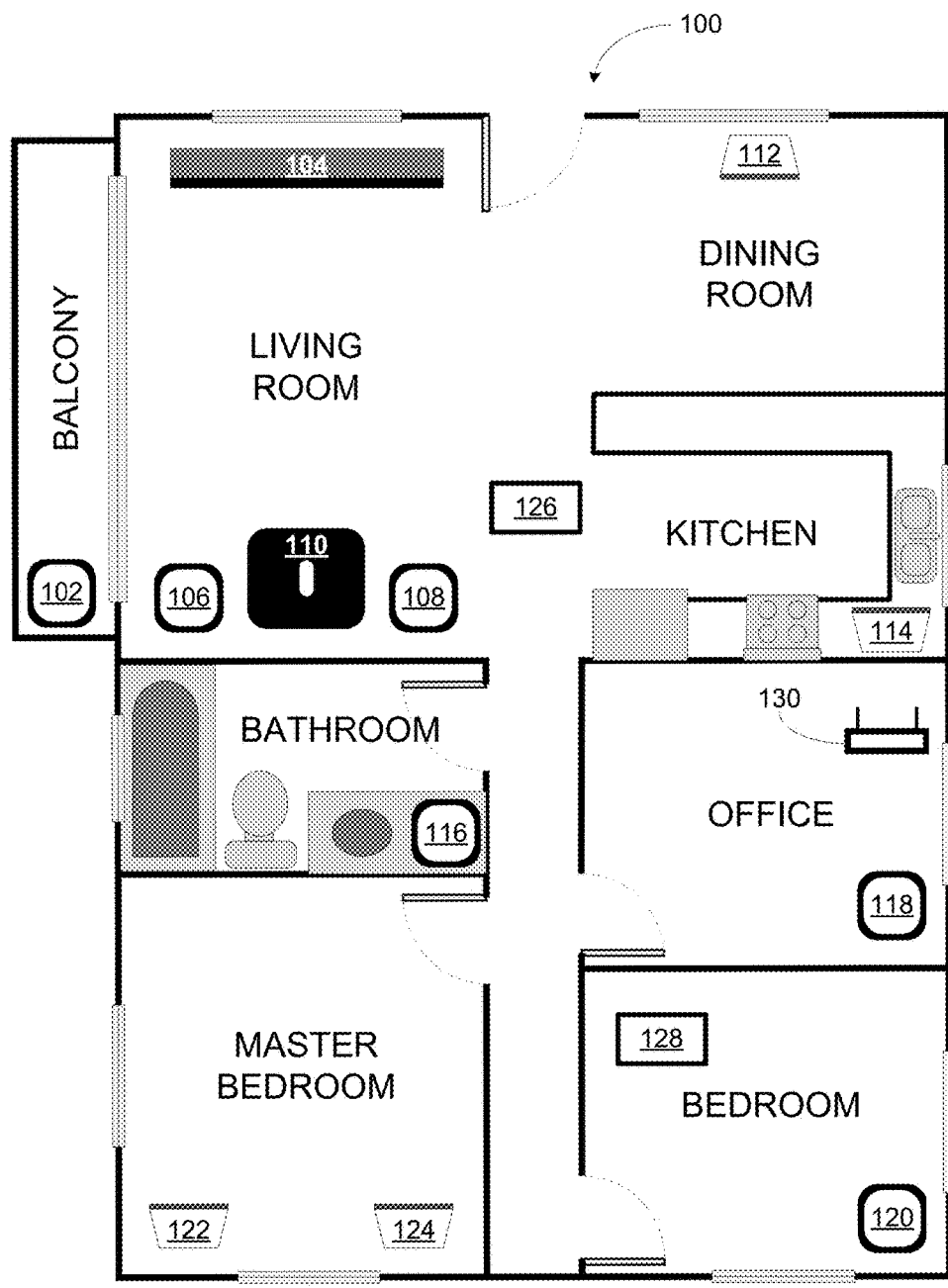
FIG. 8 shows another example media playback system configuration in which certain embodiments may be practiced.

In some cases, the particular playback device may belong to a zone that is a member of a zone group. Zone groups may include two or more zones that are configured to play media in synchrony. FIG. 8 shows the example media playback system 100 illustrated in FIGS. 1 and 6 in a configuration in which the "Living Room" and "Kitchen" zones are joined into a zone group. Further, control device 126 is now located near the Living Room and Kitchen, as shown. Control device 126 may determine that it is within a given proximity to the Living Room zone (i.e., that it is within the Living Room zone). Control device 126 (or perhaps another device of the media playback system 100) may determine that the "Living Room" zone is in a zone group that includes at least the "Living Room" zone and the "Kitchen" zone.

Figure 7C:
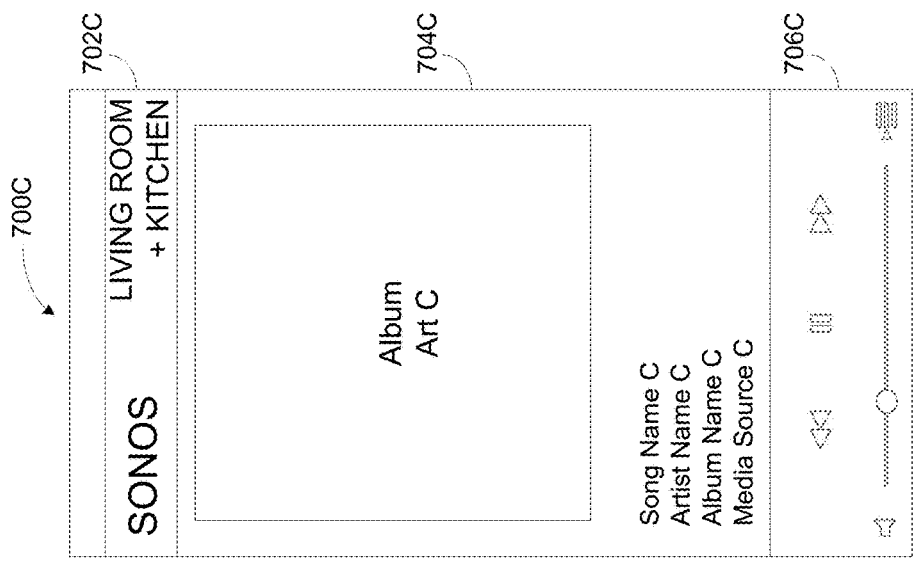

Based on that determination, the device may cause the graphical interface to display an indication of (i) an identifier of the zone group, and (ii) a characteristic of the zone group. FIG. 7C shows an example graphical interface 700C that includes a playback zone region 702C, a playback status region 704C, and a playback control region 706C. Graphical interface 700C may represent an instance of a graphical interface of control device 126 in the configuration of media playback system 100 shown in FIG. 8 in which control device 126 is in the Master Bedroom. The device may cause display of such an interface based on determining that the device is in a given proximity to the "Living Room" zone or "Kitchen" zone and further that the "Living Room" and "Kitchen" zones are grouped into a zone group. The playback zone region 702C includes an indication of the "Living Room+Kitchen" zone group, as shown. The playback status region 704C includes multiple characteristics of the "Living Room+Kitchen" zone group, including characteristics of media currently playing by the zone group or queued for playback by the zone group. The characteristics include Album Art C, Song Name C, Artist Name C, and Media Source C, which may represent a third instance of the example audio content noted above. The playback control region 706C includes transport controls for the "Living Room+Kitchen" zone group. Such controls may initiate, stop, or modify media playback by playback devices 106, 108, 110 and 114 (i.e., the playback devices in the "Living Room+Kitchen" zone group).

In some cases, before configuring the media playback system based on proximity of a device to a zone of the media playback system, the media playback system may determine that the device is currently in motion (or has been recently moved). Such a determination may be based on the respective signal strengths of received radio transmissions, as changing signal strengths may indicate that a device is moving through an environment. Alternatively, the determination may be based on data from a sensor of the device, such as an accelerometer, which indicates that the device is moving through an environment.

b. Example Method to Modify Media Playback in a Zone in Proximity to a Device.

At block 902, the method may involve receiving a radio transmission indicating a particular playback device of a media playback system. For instance, a device, such as an instance of control device 300 of FIG. 3, may receive a radio transmission via a radio interface, such as radio interface 306. This operation may include aspects of block 502, as discussed above.

At block 904, the method may involve determining that the device is within a given proximity to a zone of the media playback system (that includes the particular playback device). For instance, referring back to FIG. 6, control device 126 may determine that control device 126 is within a given proximity to the "Master Bedroom" zone of media playback system 100 based on a received radio transmission from playback device 122 or playback device 124. This operation may include aspects of block 504, as discussed above.

At block 906, the method may involve causing the particular playback device to modify media playback. For instance, control device 126 may initiate playback of a media item on playback devices 122 or 124, which are in the "Master Bedroom" zone. This operation may be based on the determination that the device is within the zone of the media playback system (e.g., that control device 126 is within the "Living Room" zone).

In some cases, control device 126 may initiate playback of a playback queue that includes one or more media items. The "Living Room" zone may then play back the one or more media items in the playback queue, perhaps in round-robin or random order, among other examples. Such a playback queue may be maintained by the media playback system, such as on a playback device. Alternatively, the playback queue may be maintained on a device that is connected via a network to the media playback system (e.g., a "cloud" computing system).

In some examples, the device may modify media playback according to at least one preference associated with the device. In such an implementation, media playback in a zone may be modified according to the at least one preference based on determining that the device is within a given proximity to the zone. The at least one preference may include, for example, media type, volume, or equalization. For instance, the device may be configured to adjust the volume of media playback by the zone to a particular level.

As another example, the device may be configured to adjust the media playback to a particular type of media, such as a particular genre, a particular playlist or set of playlists, or a particular audio content source. Further, the device may be configured to a particular equalization setting, such as a "rock", "pop", or "classical" equalization setting, or perhaps a custom equalization setting. The device may receive such preferences from a memory of the device, or from a computing system that is communicatively coupled to the device (e.g., a "cloud" computing system).

In some examples, the device may be registered to a given user profile, which may also be referred to as a user account. A user profile may include data related to a particular user, which the user has opted to provide for the user profile. Such information may include an identifier of a user (e.g., the user's name or email address) and perhaps also certain preferences or settings. As such, a particular user's profile may be a data-based representation of that particular user. User profiles may be used for various applications, web sites, and/or online services, for instance. Examples of user profiles include e-mail accounts, social network accounts, and accounts with service providers (e.g., SPOTIFY® or PANDORA®, among other examples. In some implementations, one or more user profiles may be associated with a media playback system, such that preferences (i.e., data) of the user profile may be used to configure the media playback system. Further, a user profile may be registered with a device itself. In such a configuration, based on determining that a device is within a given proximity to a zone, the device may determine that the device is registered to a given user profile, and then modify media playback in the zone according to one or more preferences associated with the given user profile.

As noted above, in some cases, a device may move from a first zone to a second zone. For instance, control device 126 may initiate media playback in the "Living Room" and subsequently move from the "Living Room" zone (as shown in FIG. 1) to the "Master Bedroom" zone (as shown in FIG. 6). Then, based on determining that control device 126 is in the "Master Bedroom" zone (e.g., that control device 126 is within a given proximity to playback device 122 and/or 124), the device may modify playback in the "Master Bedroom" zone. For example, the device may initiate media playback in the "Master Bedroom" zone. Alternatively, the device may increase the volume of playback devices 122 and 124 in the "Master Bedroom" zone.

Further, based on determining that control device 126 is in the "Living Room" zone (e.g., that control device 126 is within a given proximity to playback device 122 and/or 124), the device may modify playback in the "Living Room" zone (i.e., the zone that control device 126 left). For example, the device may cease media playback in the "Living Room" zone. Alternatively, the device may decrease the volume of playback devices 122 and 124 in the "Living Room" zone.

In other cases, movement of a device from a first zone to a second zone may cause the first zone and the second zone to group into a zone group. For instance, control device 126 may initiate media playback in the "Living Room" and subsequently move from the "Living Room" zone (as shown in FIG. 1) to the "Kitchen" zone (as shown in FIG. 8). The media playback system 100 may cause the "Living Room" zone and the "Kitchen" zone to form a zone group. After grouping, the "Living Room" zone and the "Kitchen" zone may play back a media item in synchrony. In some cases, the media item may be media that was playing in the "Living Room" zone or "Kitchen" zone before grouping into the zone group (e.g., a playback queue of either zone). In some cases, the zones may un-group based on the device leaving one or more of the zones.

In some implementations, causing the first zone and the second zone to group into a zone group may be based on determining that one or more conditions are met. For example, the device may determine that the first zone and the second zone are playing the same media item, or perhaps the same playlist, and based on such a determination, cause the first zone and the second zone to group. Alternatively, the device may determine that the device is within a given proximity to both the first zone and the second zone (e.g., that control device 126 is within a given proximity to the "Living Room" zone and the "Kitchen" zone, as shown in FIG. 8). Based on that determination, the control device 126 may initiate synchronous playback by the "Living Room" zone and the "Kitchen" zone, perhaps after grouping the zones.

As discussed above, in some cases a device may move from a first zone to a second zone. After moving to the second zone, the device may receive a radio transmission from a playback device of the second zone, and based on that received radio transmission, determine that the device is within the second zone. In some implementations, the device may further determine that the device is outside of a given proximity to the first zone. For instance, the device may attempt to detect a radio transmission from a playback device of the first zone, and based on failing to detect a radio transmission within a pre-determined period of time, determine that the device is outside of a given proximity to the first zone.

In some cases, moving the device from the first zone to a second zone may cause a playback queue of the second zone to be updated based on the first zone. For instance, the media playback system may replace the playback queue of the second zone with the playback queue of the first zone. Alternatively, the media playback system may queue media items from playback queue of the first zone into the playback queue of the second zone.

Figure 10:
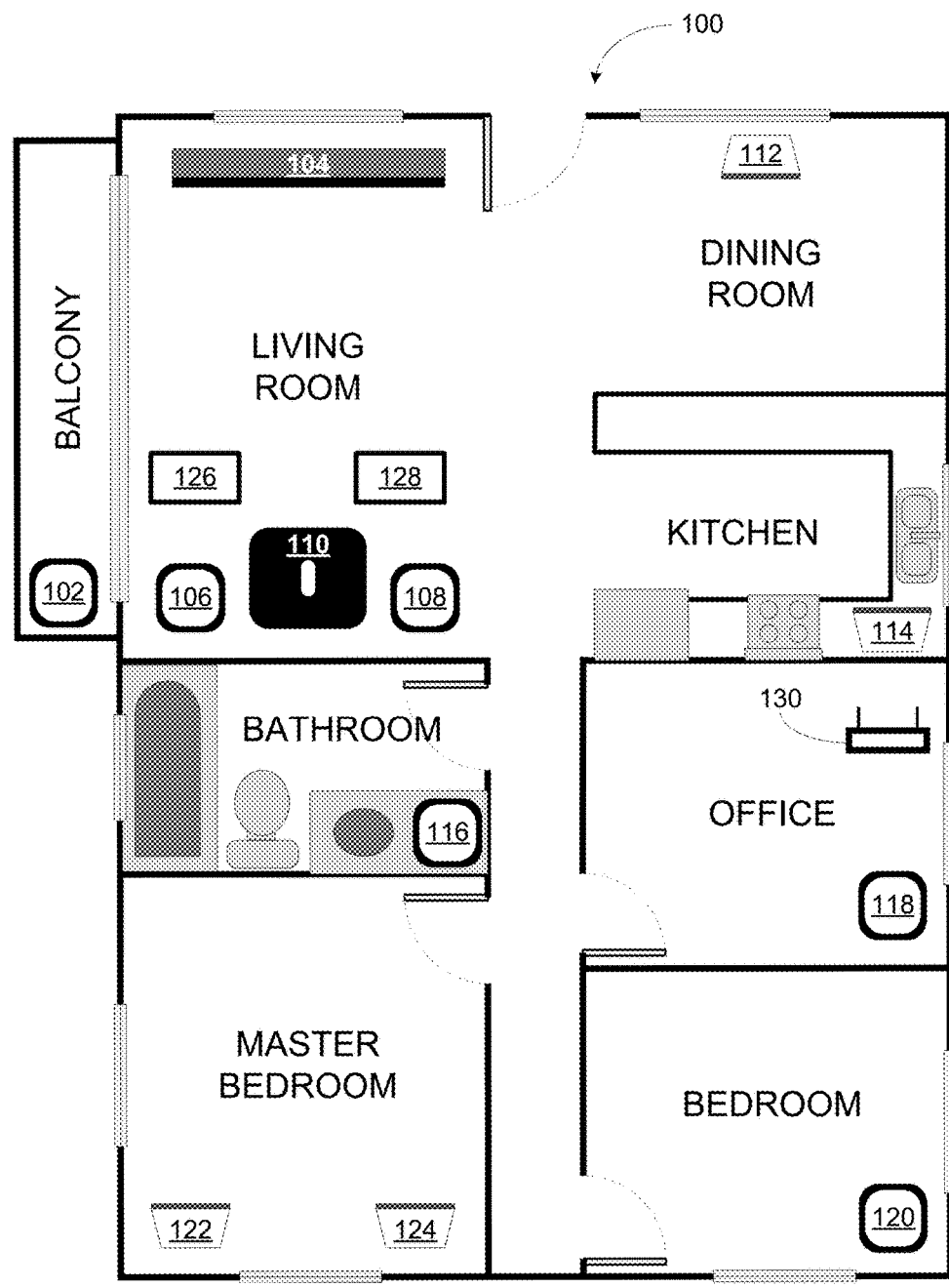
FIG. 10 shows another example media playback system configuration in which certain embodiments may be practiced.

In some cases, two or more devices may be within a given proximity to a playback device of a zone. FIG. 10 shows the example media playback system 100 of FIGS. 1, 6, and 8 in an alternate configuration in which control devices 126 and 128 are both in the "Living Room" zone. In such a configuration, media playback system 100 may determine that both control devices 126 and 128 are within a given proximity to the zone (or perhaps the playback devices of the zone). For instance, control device 126 may determine that it is within a given proximity to playback device 106, 108, and/or 110. Control device 128 may similarly determine that it is within a given proximity to playback device 106, 108, and/or 110. Based on that determination, control device 128 may send an indication that control device 128 is within the given proximity to the "Living Room" zone. Control device 126 may receive such an indication, and detect that control devices 126 and 128 are respectively within the "Living Room" zone.

The presence of two or more devices within a given proximity to a playback device of a zone may affect (or perhaps not affect) media playback in the zone. For instance, media playback in the zone may be modified based on at least one respective preference associated with each device. For instance, control device 126 may be associated with a preference for jazz or classical music, while control device 128 may be associated with a preference for classical or pop music. In such a circumstance, the media playback system 100 may determine that the devices have a preferred genre in common (i.e., classical music) and responsively play back classical music in the "Living Room" zone.

As another example, control device 128 may enter proximity of the "Living Room" zone, but, based on a pre-existing proximity of control device 126 to the "Living Room" zone, media playback in the "Living Room" zone may be unaffected by control device 128. For instance, media playback system 100 may receive a request from control device 128 to modify the media playback in the "Living Room" zone. Based on the received request modify the media playback, media playback system 100 detect that control device 126 within the given proximity to the zone of the media playback system, and deny the request.

Such operations as noted above may facilitate a joint listening experience. For example, control devices 128 and 128 may be registered to a first user profile and a second user profile, respectively (perhaps representing a first user and a second user). The second user (having on or near his person control device 128) may join the first user (having on or near his person control device 128) in a zone (e.g., the "Living Room" zone). The media playback system 100 may determine that control devices 128 and 128 (which are determined to be within the "Living Room" zone) are registered to the first user profile and a second user profile, respectively. The media playback system may then request respective preferences of each user profile. After receiving the respective preferences, the media playback system 100 may initiate or modify media playback in the "Living Room" zone based on the preferences.

In some cases, the respective preferences may be maintained on one or more "cloud" computing systems, which may facilitate joint listening experiences between users using respective media playback systems and devices. For instance, the first user may create a user profile registered to a first instance of media playback system 100. As noted above, the user profile may indicate various preferences. Such preferences may include a listening history of the first user on the first instance of media playback system 100. The listening history may indicate one or more media items that the first instance of media playback system 100 played back while the first user profile was "logged-in" or "active" and perhaps a number of instances on which the each media item was played. The second user may create a similar user profile registered to a second instance of media playback system 100. These user profiles may be maintained on one or more "cloud" computing systems.

The first user may then visit the second user, perhaps bringing the first device with him (which is registered with the first user profile). The second instance of media playback system 100 may detect that both the first device (registered to the first user) and the second device (registered to the first user) are within a given proximity to a zone of the media playback system. The second instance may also determine that the first device and the second device are registered to respective user accounts. Then, based on determining that the first device and the second device are registered to respective user accounts, request, over a network interface, respective preferences associated with the first user profile and the second user profile. As the user accounts are maintained on one or more "cloud" computing systems, both user profiles and the associated preferences may be accessible to the media playback system. After requesting the respective preferences, the media playback system may receive, over the network interface, the requested respective preferences and modify media playback based on the received preferences.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application may involve determining that a device of a media playback system is within a particular zone of the media playback system and responsively configuring the media playback system based on the particular zone that the device is within. In one aspect, a method is provided. The method may involve receiving, via the radio interface, a radio transmission indicating a particular playback device of a media playback system. Based on the received radio transmission, the method may also involve determining that the device is within a given proximity to a zone of the media playback system. Based on determining that the device is within the given proximity to the zone of the media playback system, the method may further involve causing the graphical interface to display an indication of (i) an identifier of the zone and (ii) a characteristic of the zone.

In another aspect, a device is provided. The device may include a graphical interface, a radio interface, at least one processor; a data storage; and a program logic stored in the data storage and executable by the at least one processor to perform operations. The operations may include receiving, via the radio interface, a radio transmission indicating a particular playback device of a media playback system. Based on the received radio transmission, the operations may also include determining that the device is within a given proximity to a zone of the media playback system. Based on determining that the device is within the given proximity to the zone of the media playback system, the operations may further include causing the graphical interface to display an indication of (i) an identifier of the zone and (ii) a characteristic of the zone.

In yet another aspect, a non-transitory computer readable memory is provided. The non-transitory computer readable memory has stored thereon instructions executable by a device to cause the device to perform functions. The function may include receiving, via the radio interface, a radio transmission indicating a particular playback device of a media playback system. Based on the received radio transmission, the functions may also include determining that the device is within a given proximity to a zone of the media playback system. Based on determining that the device is within the given proximity to the zone of the media playback system, the functions may further include causing the graphical interface to display an indication of (i) an identifier of the zone and (ii) a characteristic of the zone.

In another aspect, another method is provided. The method may involve receiving, via the radio interface, a radio transmission indicating a particular playback device of a media playback system. Based on the received radio transmission, the method may also involve determining that the device is within a given proximity to a zone of the media playback system. Based on determining that the device is within the given proximity to the zone of the media playback system, the method may further involve causing the particular playback device to modify media playback.

In a further aspect, another device is provided. The device may include a graphical interface, a radio interface, at least one processor; a data storage; and a program logic stored in the data storage and executable by the at least one processor to perform operations. The operations may include receiving, via the radio interface, a radio transmission indicating a particular playback device of a media playback system. Based on the received radio transmission, the operations may also include determining that the device is within a given proximity to a zone of the media playback system. Based on determining that the device is within the given proximity to the zone of the media playback system, the operations may further include causing the particular playback device to modify media playback.

In yet another aspect, another non-transitory computer readable memory is provided. The non-transitory computer readable memory has stored thereon instructions executable by a device to cause the device to perform functions. The function may include receiving, via the radio interface, a radio transmission indicating a particular playback device of a media playback system. Based on the received radio transmission, the functions may also include determining that the device is within a given proximity to a zone of the media playback system. Based on determining that the device is within the given proximity to the zone of the media playback system, the functions may further include causing particular playback device to modify media playback.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. Tangible, non-transitory computer-readable media storing instructions that, when executed by one or more processors of a mobile device, cause the mobile device to perform operations comprising:
causing a display of the mobile device to display a first graphical interface comprising a presentation of (i) an identifier of a first zone of a media playback system, and (ii) a status of the first zone, wherein the status of the first zone comprises a first media item played back by a first playback device;
while causing the mobile device to display the first graphical interface, receiving, via a radio interface of the mobile device, a radio transmission indicating a second playback device, wherein the second playback device is currently playing back a second media item, and wherein the second playback device is in a second zone of the media playback system;

determining that the received radio transmission indicates that the mobile device is within a given proximity to the second zone of the media playback system; and in response to determining that the received radio transmission indicates that the mobile device is within the given proximity to the second zone of the media playback system, updating, independently of user input on the mobile device, the display of the mobile device to display a second graphical interface comprising a presentation of (i) an identifier of the second zone, and (ii) a status of the second zone, wherein the status of the second zone comprises the second media item currently played back by the second playback device.

2. The tangible, non-transitory computer-readable media of claim 1, wherein the presentation of the status of the second zone further comprises an indication of at least one media item queued for playback by the second playback device.

3. The tangible, non-transitory computer-readable media of claim 1, wherein receiving the radio transmission indicating the second playback device of the media playback system comprises:

receiving a message that indicates that the second playback device is within a given proximity to the mobile device.

4. The tangible, non-transitory computer-readable media of claim 1, wherein:

the radio interface of the mobile device comprises a short-range radio interface that operates according to a wireless protocol having a known transmission strength;

wherein receiving the radio transmission indicating the second playback device of the media playback system comprises receiving, from the second playback device, the radio transmission according to the protocol, wherein the received radio transmission has a receive strength; and wherein determining that the received radio transmission indicates that the mobile device is within the given proximity to the second zone of the media playback system comprises determining that the receive strength of the received radio transmission is greater than a pre-determined threshold strength, wherein the pre-determined threshold strength is a pre-determined percentage of the known transmission strength.

5. The tangible, non-transitory computer-readable media of claim 1, wherein:

the media playback system comprises multiple playback devices that include respective wireless access points;

wherein receiving the radio transmission indicating the second playback device of the media playback system comprises detecting, from at least two of the respective wireless access points, a respective signal having a signal strength; and wherein determining that the received radio transmission indicates that the mobile device is within the given proximity to the second zone of the media playback system comprises:

based on the signal strengths of the detected signals, determining that the received radio transmission from the second playback device has the strongest signal strength among the respective signal strengths of the at least two wireless access points; and based on the determining that the second playback device has the strongest signal strength among the respective signal strengths of the wireless access points, determining that, among the multiple playback devices, the second playback device is nearest to the mobile device.

6. The tangible, non-transitory computer-readable media of claim 1, wherein the operations further comprise:

determining that the second zone is in a zone group that includes at least a third zone and the second zone, wherein the third zone and the second zone are configured to play back the second media item in synchrony while in the zone group; and wherein updating the display of the mobile device to display the second graphical interface comprising the presentation of (i) the identifier of the second zone and (ii) the status of the second zone further comprises:

based on determining that the second zone is in the zone group that includes at least the third zone and the second zone, causing the second graphical interface to include an indication of (i) an identifier of the zone group, and (ii) a characteristic of the zone group.

7. The tangible, non-transitory computer-readable media of claim 1, wherein the operations further comprise:

based on determining that the received radio transmission indicates that the mobile device is within the given proximity to the second zone of the media playback system, causing the first zone and the second zone to play back the second media item in synchrony.

8. The tangible, non-transitory computer-readable media of claim 1, wherein the operations further comprise:

receiving, via the radio interface, a first radio transmission indicating the first playback device, wherein the radio transmission indicating the second playback device is a second radio transmission, wherein the first radio transmission has a first signal strength, and wherein the second radio transmission has a second signal strength;

determining that the received second radio transmission indicates that the mobile device is within the given proximity to the first zone of the media playback system; and wherein determining that the mobile device is within the given proximity to the second zone of the media playback system comprises, based on the first received radio transmission and the second received radio transmission, determining that the mobile device is nearer to the second playback device than to the first playback device.

* * * * *